United States Patent
Tseng et al.

(10) Patent No.: US 8,214,716 B2
(45) Date of Patent: Jul. 3, 2012

(54) METHOD FOR PROCESSING NOISE INTERFERENCE IN DATA ACCESSING DEVICE WITH SERIAL ADVANCED TECHNOLOGY ATTACHMENT INTERFACE

(75) Inventors: Pao-Ching Tseng, Hsin Chu (TW); Shu-Fang Tsai, Hsin Chu (TW); Chuan Liu, Jen Te Hsiang (TW)

(73) Assignee: Mediatek Inc., Hsin Chu (TW)

( * ) Notice: Subject to any disclaimer, the term of this patent is extended or adjusted under 35 U.S.C. 154(b) by 299 days.

(21) Appl. No.: 12/574,891

(22) Filed: Oct. 7, 2009

(65) Prior Publication Data

US 2010/0031131 A1    Feb. 4, 2010

Related U.S. Application Data

(63) Continuation of application No. 11/070,148, filed on Mar. 3, 2005, now Pat. No. 7,624,332.

(30) Foreign Application Priority Data

Apr. 30, 2004   (TW) ................................ 93112284 A

(51) Int. Cl.
    *H03M 13/00* (2006.01)
(52) U.S. Cl. ..................... 714/758; 714/704; 714/799
(58) Field of Classification Search ............... 714/52, 714/54, 704, 758, 799
    See application file for complete search history.

(56) References Cited

U.S. PATENT DOCUMENTS

| 5,784,387 | A | 7/1998 | Widmer |
| 6,763,477 | B1 | 7/2004 | McGee |
| 6,853,573 | B2 | 2/2005 | Kim et al. |
| 6,854,045 | B2 | 2/2005 | Ooi et al. |
| 6,922,738 | B2 | 7/2005 | Drescher et al. |
| 6,948,036 | B2 | 9/2005 | Grieff et al. |
| 6,961,787 | B2 | 11/2005 | Ooi |
| 6,961,813 | B2 | 11/2005 | Grieff et al. |
| 6,983,338 | B2 | 1/2006 | Hadba et al. |
| 6,987,770 | B1 | 1/2006 | Yonge, III |
| 7,047,335 | B2 | 5/2006 | Schauer et al. |
| 7,178,054 | B2 | 2/2007 | Seto et al. |

(Continued)

FOREIGN PATENT DOCUMENTS

TW   I233067   5/2005

(Continued)

OTHER PUBLICATIONS

APT Technologies, Inc. et al., "Serial ATA: High Speed Serialized AT Attachement," SerialATA Workgroup, Revision 1.0, Aug. 29, 2001.

*Primary Examiner* — Esaw Abraham

(74) *Attorney, Agent, or Firm* — Muncy, Geissler, Olds & Lowe, PLLC

(57) ABSTRACT

A method for processing noise interference in a serial advanced technology attachment (SATA) interface. In the method, when a receiver does not receive a SOF primitive (start of frame primitive) but does receive an EOF primitive (end of frame primitive) or WTRM primitive (wait for frame termination primitive), the receiver outputs a R_ERR primitive (reception error primitive) to enable a transmitter to resend original data and thus to eliminate the interference. In addition, if the transmitter detects an error during the data transmission, a HOLD primitive (hold data transmission primitive) will be issued to temporarily stop the data transmission.

4 Claims, 5 Drawing Sheets

U.S. PATENT DOCUMENTS

| | | | |
|---|---|---|---|
| 7,178,545 B2 | 2/2007 | Zelczer et al. | |
| 7,284,082 B2 | 10/2007 | Greenberger | |
| 7,339,500 B2 | 3/2008 | Noda | |
| 7,343,545 B2 | 3/2008 | Tseng et al. | |
| 7,360,119 B1 | 4/2008 | Stenfort et al. | |
| 7,384,082 B2 | 6/2008 | Blake | |
| 7,424,628 B2 | 9/2008 | Matsuumoto et al. | |
| 7,447,826 B2 * | 11/2008 | Seto et al. | 710/310 |
| 7,477,649 B2 | 1/2009 | Paulson et al. | |
| 7,496,691 B2 | 2/2009 | Ayyavu et al. | |
| 7,523,235 B2 | 4/2009 | Nemazie et al. | |
| 7,523,236 B1 | 4/2009 | Nemazie et al. | |
| 7,539,797 B2 | 5/2009 | Nemazie et al. | |
| 7,664,042 B2 | 2/2010 | Utsunomiya et al. | |
| 7,665,011 B2 | 2/2010 | Tseng et al. | |
| 2003/0236952 A1 | 12/2003 | Grieff et al. | |
| 2003/0236953 A1 | 12/2003 | Grieff et al. | |
| 2004/0019718 A1 | 1/2004 | Schauer et al. | |
| 2004/0100944 A1 * | 5/2004 | Richmond et al. | 370/360 |
| 2004/0252716 A1 * | 12/2004 | Nemazie | 370/447 |
| 2005/0144490 A1 | 6/2005 | Igari | |
| 2005/0188245 A1 | 8/2005 | Seto et al. | |
| 2005/0223140 A1 * | 10/2005 | Seto et al. | 710/52 |
| 2005/0240855 A1 | 10/2005 | Tseng et al. | |
| 2006/0095594 A1 | 5/2006 | Chen et al. | |

FOREIGN PATENT DOCUMENTS

| | | |
|---|---|---|
| TW | 200535796 | 11/2005 |

* cited by examiner

| sending device | receiving device | description |
|---|---|---|
| SYNC | SYNC | |
| SYNC | SYNC | |
| X_RDY | SYNC | Ready for sending data in sending device |
| X_RDY | SYNC | |
| X_RDY | R_RDY | Ready for receiving data in receiving device |
| X_RDY | R_RDY | |
| SOF | R_RDY | Packet start |
| Payload 0 | R_RDY | |
| Payload 1 | R_IP | |
| ... | ... | |
| Payload n | R_IP | |
| CRC | R_IP | |
| EOF | R_IP | Packet end |
| WTRM | R_IP | |
| WTRM | R_IP | |
| WTRM | R_OK | Receive-OK |
| WTRM | R_OK | |
| SYNC | R_OK | |
| SYNC | R_OK | |
| SYNC | SYNC | |

FIG. 2 (Related Art)

| sending device | receiving device | description |
|---|---|---|
| SYNC | SYNC | |
| SYNC | SYNC | |
| X_RDY | SYNC | Ready for sending data in sending device |
| X_RDY | SYNC | |
| X_RDY | R_RDY | Ready for receiving data in receiving device |
| X_RDY | R_RDY | |
| SOF | R_RDY | Packet start |
| Payload 0 | R_RDY | |
| Payload 1 | R_IP | |
| ... | ... | |
| Payload x | R_IP | |
| HOLD | R_IP | HOLD |
| HOLD | HOLDA | Hold Acknowledge |
| Payload x+1 | HOLDA | |
| Payload x+2 | R_IP | |
| Payload x+3 | R_IP | |
| ... | ... | |
| Payload n | R_IP | |
| CRC | R_IP | |
| EOF | R_IP | Packet end |
| WTRM | R_IP | |
| WTRM | R_IP | |
| WTRM | R_OK | Receive-OK |
| WTRM | R_OK | |
| SYNC | R_OK | |
| SYNC | R_OK | |
| SYNC | SYNC | |

FIG. 3 (Related Art)

METHOD FOR PROCESSING NOISE INTERFERENCE IN DATA ACCESSING DEVICE WITH SERIAL ADVANCED TECHNOLOGY ATTACHMENT INTERFACE

CROSS REFERENCE TO RELATED APPLICATIONS

This application is a Continuation of application Ser. No. 11/070,148 which is now issued U.S. Pat. No. 7,624,332 on Nov. 24, 2009 and filed on Mar. 3, 2005, for which priority is claimed under 35 USC §120, and this application claims priority of Application No. 093112284, filed in Taiwan, R.O.C. on Apr. 30, 2004, the entire contents of which are hereby incorporated by reference.

BACKGROUND OF THE INVENTION

1. Field of the Invention

The invention relates to a method for processing noise interference, and more particularly to a method for processing noise interference in a serial advanced technology attachment (SATA) interface according to the error condition in a receiver.

2. Description of the Related Art

The serial ATA (Serial Advanced Technology Attachment, hereinafter referred to as SATA) is an interface specification commonly promoted by the companies of APT, Dell, IBM, Intel, Maxtor, Seagate, etc. The SATA specification is applied to the transmission interface of a hard disk drive or an optical disk drive to replace parallel ATA/ATAPI interface that has been used for a long time. The SATA interface specification specifies two pairs of differential signal lines to replace the original 40 or 80 signal lines connected in parallel. Serializing the original data can reduce the size and voltage and increase the speed. The specification also introduces some new functions, such as flow control and error resending, to control the data stream in a simple way.

FIG. 1 is a schematic illustration showing communication layers in the SATA specification. As shown in FIG. 1, the SATA interface connects a host 11 to a device 12. The device 12 may be an optical storage device or a hard disk drive, or other devices with the SATA interface. The communication layers in the SATA specification include four layers, which are respectively a first layer (physical layer), a second layer (link layer), a third layer (transport layer) and a fourth layer (application layer). The physical layer is responsible for converting digital and analog signals. That is, the physical layer receives and converts a digital signal sent from the link layer into an analog signal and sends the analog signal to the other end. The physical layer also receives and converts the analog signal, which comes from the other end, into a digital signal and outputs the digital signal to the link layer. The link layer encodes and decodes the digital data. That is, the link layer encodes the data coming from the transport layer and outputs the encoded data to the physical layer. On the other hand, the link layer decodes the data coming from the physical layer and outputs the decoded data to the transport layer. The transport layer constructs and deconstructs the FIS (Frame Information Structure). The detailed definition of the FIS can be found in the SATA specification. The application layer is in charge of buffer memory and DMA engine(s).

During the serializing process, the sending device converts the parallel data (e.g., data in bytes or words) into a serial bit data stream. In addition to the typical data, the SATA specification defines some data control codes with four bytes, which are referred to as primitives, for controlling the sending and power management of the sending device and the receiving device. For example, a X_RDY primitive (transmission data ready primitive) represents that the sending device is ready to send the data, and a R_RDY primitive (receiver ready primitive) represents that the receiving device is ready to receive data.

FIG. 2 is a schematic illustration showing a packet sent through the SATA interface. Two devices communicate with each other to send the packet according to the X_RDY primitive (transmission data ready primitive) and the R_RDY primitive (receiver ready primitive). Then, the sending side sends a packet content, which is packed by a SOF primitive (start of frame) and an EOF primitive (End of frame). After the the packet content is sent completely, the sending side sends a WTRM primitive (wait for frame termination primitive). If there is no any error about the CRC (Cyclic Redundancy Check) check in the link, the receiving side responds with a R_OK primitive (reception with no error primitive) after it receives the WTRM primitive. If there is an error about the CRC check, the receiving side responds with R_ERR primitive (reception error).

In addition to the above-mentioned primitives, the specification further provides a HOLD primitive (hold data transmission primitive) and a HOLDA primitive (hold acknowledge primitive) for the flow control. The transmitter can output the HOLD primitive when it cannot transmit data temporarily, and the receiver responds with the HOLDA primitive. Alternatively, the receiver can output the HOLD primitive when it cannot receive the data, and the transmitter has to stop transmitting data and to transmit the HOLDA primitive so as to avoid data loss after it has received the HOLD primitive. FIG. 3 shows an example of using the HOLD primitive and the HOLDA primitive.

However, if the SOF primitive is interfered by the noise during the transmission such that the receiver cannot recognize the SOF primitive, the receiver continuously outputs the R_RDY Primitive. Hence, because the transmitter does not know that the receiver does not receive the SOF primitive, the transmitter transmits the rest of data until the WTRM primitive is sent. Because the receiver does not receive the SOF primitive, the receiver responds with a SYNC primitive (synchronization primitive) when the receiver receives the data. After the transmitter receives the synchronous primitive, the system will halt.

SUMMARY OF THE INVENTION

It is therefore an object of the invention to provide a method for processing noise interference, in which a receiver outputs a R_ERR primitive (receiving error primitive) to process the noise interference.

To achieve the above-mentioned object, the method of the invention for processing noise interference includes the steps of: enabling a receiver to output the R_RDY primitive after the X_RDY primitive is received; enabling the receiver to detect the EOF primitive and output the R_ERR primitive if the SOF primitive is not detected since it receives X_RDY primitive; and enabling the receiver to start to receive data after the SOF primitive is received.

BRIEF DESCRIPTION OF THE DRAWINGS

FIG. 2 is a schematic illustration showing a FIS sent through the SATA interface of the prior art.

FIG. 3 is another schematic illustration showing a FIS sent through the SATA interface of the prior art.

DETAILED DESCRIPTION OF THE INVENTION

Figure 1:
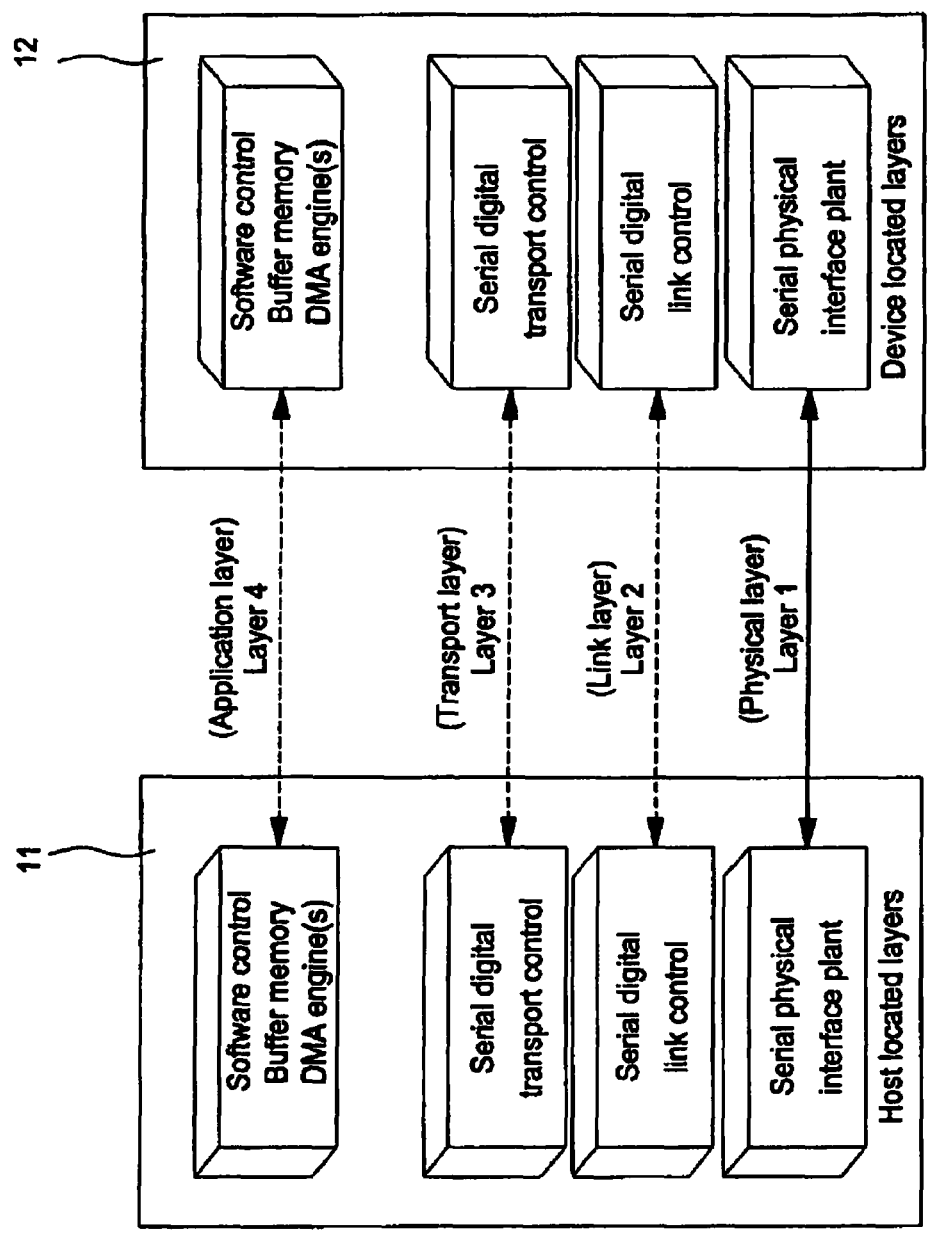
FIG. 1 is a schematic illustration showing communication layers in the SATA Specification of the prior art.
Figure 4:
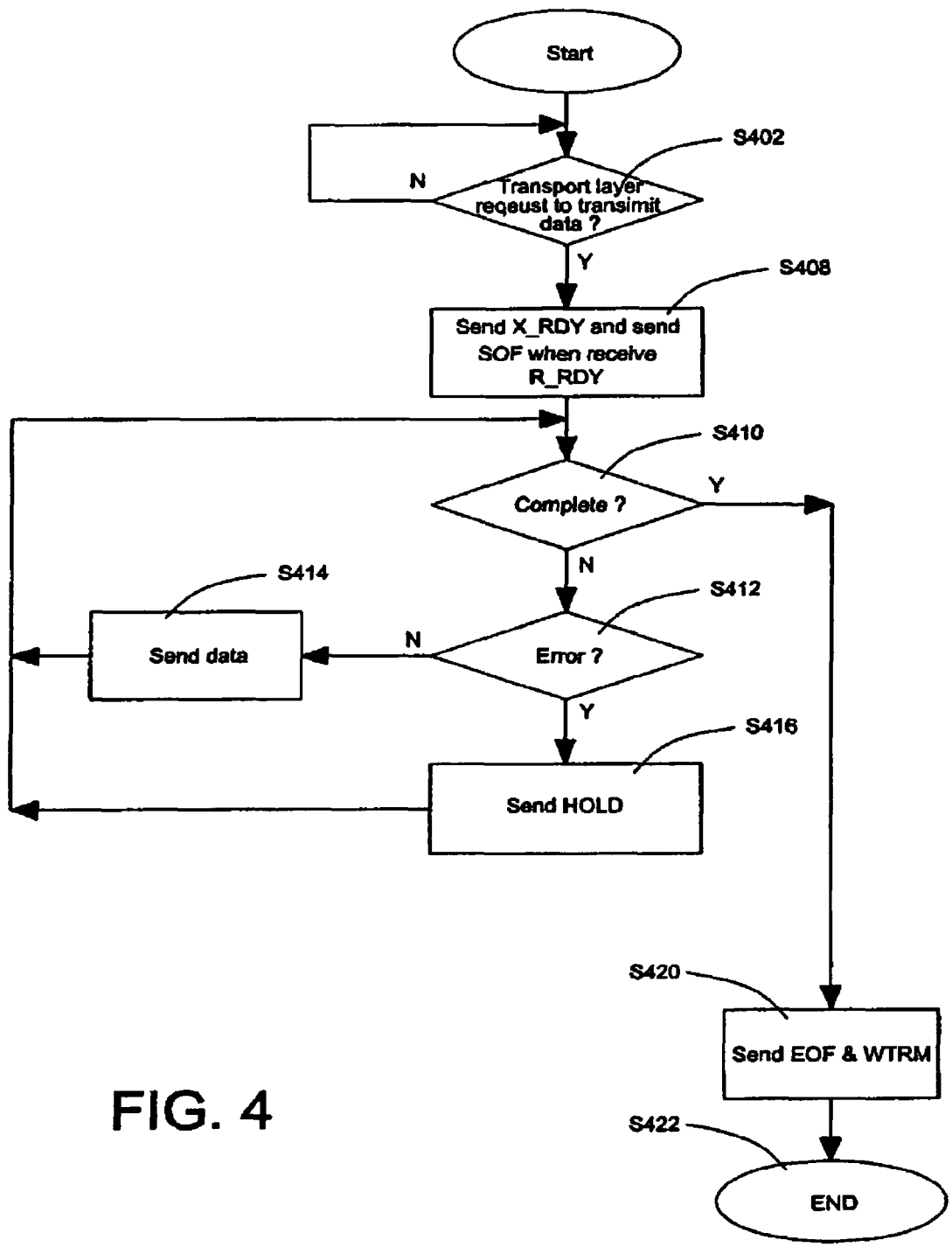
FIG. 4 is a flow chart showing a method for processing noise interference according to a first embodiment of the invention, wherein a HOLD primitive is issued to process the noise interference.
Figure 5:
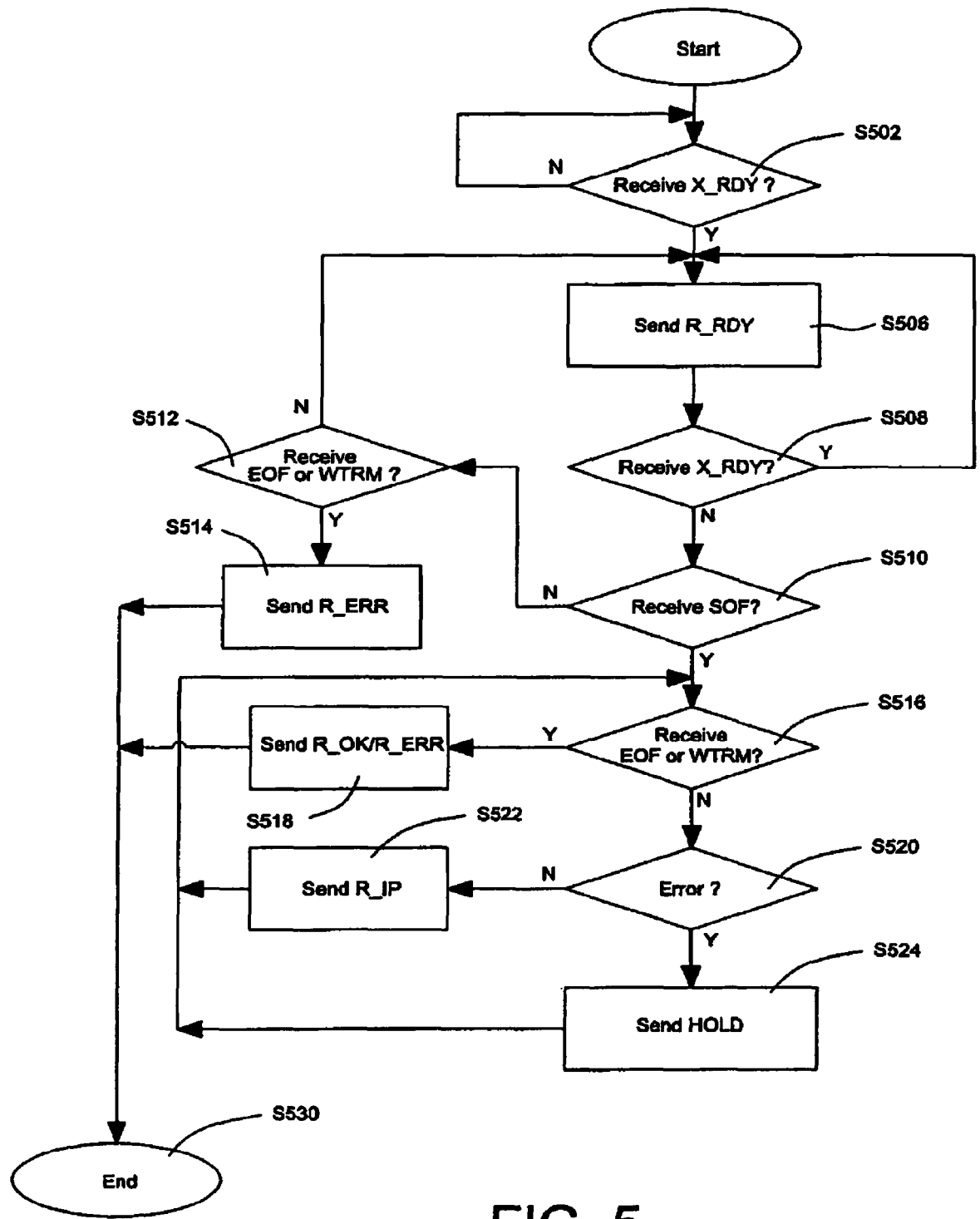
FIG. 5 is a flow chart showing a method for processing noise interference according to a second embodiment of the invention, wherein a R_ERR primitive is issued to process the noise interference.

The invention will be described with reference to the accompanying drawings. FIG. 4 is a flow chart showing a method for processing the interference according to a first embodiment of the invention. The method for processing the interference utilizes a HOLD primitive to process the interference. FIG. 5 is a flow chart showing a method for processing interference according to a second embodiment of the invention. The method for processing the interference utilizes a R_ERR primitive to process the interference. The methods of the invention for processing the interference will be described with reference to FIGS. 4 and 5.

Step S402 is to detect whether the transport layer requests the data transmission. When the transport layer does not request the data transmission, the step is repeated. If the transport layer requests the data transmission, the procedure jumps to a next step (Step S408).

Step S408 is to output a X_RDY Primitive and to output a SOF primitive after a R_RDY primitive is received. Then, the procedure jumps to step S410.

Step S410 is to check whether the data transmission is finished. If the data transmission is completed, the procedure jumps to step S420; or otherwise the procedure jumps to step S412.

Step S412 is to detect whether an error exists. The so-called error means the 8b/10b decoding error, the 8b/10b disparity error, that the received primitive cannot be recognized, or the physical layer error. When there is an error occurred, the procedure jumps to step S416; or otherwise the procedure jumps to step S414.

Step S414 is to output data and then the procedure jumps back to step S410.

Step S416 is to output a HOLD primitive, and then the procedure jumps back to step S410.

Step S420 is to output an EOF primitive and a WTRM primitive.

Step S422 is the ending.

Therefore, according to the above-mentioned steps, a HOLD primitive will be issued when the receiver has detected an error.

The operation flow of the receiver will be described with reference to FIG. 5.

Step S502 is to detect whether the device in the far end requests to transmit data. When the device in the far end does not request to transmit data, the step is repeated. If it requests the data transmission, the procedure jumps to a next step (Step S506).

Step S506 is to output a R_RDY primitive and then the procedure jumps to step S508.

Step S508 is to detect whether the X_RDY primitive exists. If the X_RDY primitive is detected, the procedure jumps back to step S506; or otherwise the procedure jumps to step S510.

Step S510 is to detect whether the SOF primitive exists. If the SOF primitive is detected, the procedure jumps to step S516; or otherwise the procedure jumps to step S512.

Step S512 is to detect whether an EOF primitive or a WTRM primitive exists. If any of the two primitives is detected, the procedure jumps to step S514; or otherwise the procedure jumps back to step S506.

Step S514 is to output a R_ERR primitive, and then the procedure jumps to step S530.

Step S516 is to detect whether an EOF primitive or a WTRM primitive exists. If one of the two primitives is detected, the procedure jumps to step S518. If both of the two primitives are not detected, the procedure jumps to step S520.

Step S518 is to output a R_OK primitive or a R_ERR primitive, and then the procedure jumps to step S530. If the CRC value calculated according to the received data is not equal to the CRC value transmitted from the other side, the R_ERR primitive is outputted, or otherwise the R_OK primitive is outputted.

Step S520 is to detect whether there is an error. The so-called error means that the 8b/10b decoding error, the decoding/disparity error, or the physical layer error. When there is an error occurred, the procedure jumps to step S524; or otherwise the procedure jumps to step S522.

Step S522 is to output a R_IP primitive (reception in progress primitive) and then the procedure jumps back to step S516.

Step S524 is to output a HOLD primitive and then the procedure jumps back to step S516.

Step S530 is the ending.

According to the above-mentioned steps, when the receiver receives an EOF primitive or a WTRM primitive before the SOF primitive is received, it represents that the SOF primitive is interfered by the noise and cannot be recognized by the receiver. So, the receiver outputs the R_ERR primitive after it receives the EOF primitive or the WTRM primitive. Thus, the transmitter resends data after it receives the R_ERR primitive. It is possible to avoid the dead lock condition between the receiver and the transmitter, and the function of avoiding errors may be achieved.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for processing noise interference in a data accessing device with a SATA (serial advanced technology attachment) interface, wherein the SATA interface comprises a transmitter and a receiver and the receiver has an error detecting module, the method comprising the steps of:
   receiving data from the SATA interface;
   detecting whether an error exists;
   enabling the receiver to output a HOLD primitive (HOLD data transmission primitive) if the error is detected, to hold the data transmitting from SATA interface.

2. The method according to claim 1, wherein the error detecting module detects 8b/10b coding errors, disparity errors, erroneous primitives or Link/Physical layer errors.

3. A method for processing noise interference in a data accessing device with a SATA (Serial Advanced Technology Attachment) interface, wherein the SATA interface comprises a transmitter and a receiver and the transmitter has an error detecting module, the method comprising the steps of:
   transmitting data from the SATA interface;
   detecting whether an error exists;
   enabling the transmitter to output a HOLD primitive if the error is detected while the transmitter is transmitting data.

4. The method according to claim 3, wherein the error detecting module detects 8b/10b coding errors, disparity errors, erroneous primitives in receiving path or Link/Physical layer errors.

* * * * *